US006850732B2

United States Patent
Patterson et al.

(10) Patent No.: US 6,850,732 B2
(45) Date of Patent: Feb. 1, 2005

(54) SCALABLE SATELLITE DATA COMMUNICATION SYSTEM THAT PROVIDES INCREMENTAL GLOBAL BROADBAND SERVICE USING EARTH-FIXED CELLS

(75) Inventors: David P. Patterson, Bellevue, WA (US); Farzad Ghazvinian, Mercer Island, WA (US); Sami Hinedi, Kirkland, WA (US); Len Quadracci, Seattle, WA (US); Mark A. Sturza, Encino, CA (US)

(73) Assignee: Wengen Wireless LLC, Bellevue, WA (US)

( * ) Notice: Subject to any disclaimer, the term of this patent is extended or adjusted under 35 U.S.C. 154(b) by 439 days.

(21) Appl. No.: 10/113,840

(22) Filed: Mar. 29, 2002

(65) Prior Publication Data

US 2003/0050008 A1 Mar. 13, 2003

Related U.S. Application Data

(60) Provisional application No. 60/280,690, filed on Mar. 30, 2001.

(51) Int. Cl.⁷ .............................................. H04B 7/185

(52) U.S. Cl. ...................... 455/12.1; 455/13.2; 455/427

(58) Field of Search ............................... 455/12.1, 13.2, 455/13.3, 561, 427, 430, 525, 554.2, 575.7

(56) References Cited

U.S. PATENT DOCUMENTS

| | | | | |
|---|---|---|---|---|
| 5,559,806 A | * | 9/1996 | Kurby et al. | 370/325 |
| 6,370,126 B1 | * | 4/2002 | De Baere et al. | 370/316 |
| 6,542,739 B1 | * | 4/2003 | Garner | 455/427 |
| 2002/0013149 A1 | * | 1/2002 | Threadgill et al. | 455/427 |
| 2002/0122408 A1 | * | 9/2002 | Mullins | 370/347 |
| 2003/0123481 A1 | * | 7/2003 | Neale et al. | 370/466 |

* cited by examiner

Primary Examiner—Nick Corsaro
Assistant Examiner—Tan Trinh
(74) Attorney, Agent, or Firm—Fulbright & Jaworski L.L.P.

(57) ABSTRACT

A scalable satellite data communication system that provides incremental global broadband services using Earth-fixed cells may begin with a limited satellite deployment that initially serves a limited number of Earth-fixed cells. The system has the flexibility to incrementally increase the number of Earth-fixed cells that are served, with minimal constraints on the relative locations of the cells on the Earth, by adding satellites of potentially greater complexity to the system. Backward compatibility with existing user terminals is achieved by maintaining the same satellite communication interface as with the already-deployed satellite constellation. Continuous and/or non-continuous service may be provided to selected Earth-fixed cells. Scheduled non-continuous service is particularly advantageous for bulk data transport services. Satellites may use simple mechanically-steered antennas. Communication links may be handed from one satellite to another when one satellite moves out of range and is no longer able to cover a selected Earth-fixed cell.

1 Claim, 10 Drawing Sheets

SCALABLE SATELLITE DATA COMMUNICATION SYSTEM THAT PROVIDES INCREMENTAL GLOBAL BROADBAND SERVICE USING EARTH-FIXED CELLS

CROSS-REFERENCE TO RELATED APPLICATION

This application claims the benefit of the filing date of U.S. Provisional Patent Application No. 60/280,690, filed Mar. 30, 2001.

FIELD OF THE INVENTION

The present invention relates to data communication, and more particularly to data communication systems and methods using satellites.

BACKGROUND OF THE INVENTION

Data communication networks that use satellite links to communicate data are generally known. Such networks typically include a number of ground terminals on the Earth and one or more satellites orbiting above the Earth. The ground terminals communicate with one another by way of one or more satellites. Prior U.S. patents assigned to the assignee of the present invention have described satellite communication networks that include hundreds of low-Earth orbit (LEO) satellites. See, e.g., U.S. Pat. Nos. 5,408, 237; 5,527,001; 5,548,294; 5,642,122; 5,650,788; 5,736, 959; and 5,740,164. The satellites in these networks are capable of transmitting data between them and to and from ground terminals on the Earth's surface.

A satellite's "communication footprint" defines a portion of the Earth's surface over which the satellite can communicate with ground terminals on the Earth. During the period of time that a ground terminal is within the border of a satellite's communication footprint, the ground terminal may transmit data signals to and receive data signals from the satellite. A constellation of satellites may be configured to transfer, or "hand-off," communication links from one satellite to another satellite when the first satellite's communication footprint no longer covers the ground terminal.

"Cells" may be defined within a satellite's communication footprint to identify geographic areas for which the satellite provides data communication service. A satellite data communication network of the type described above may be configured to serve "Earth-fixed cells" or "satellite-fixed cells." In a network that employs satellite-fixed cells, the cells move in the same direction and velocity as the nadir of the satellite projected on the Earth's surface as the satellite moves through its orbit. In contrast, Earth-fixed cells are regions mapped onto the surface of the Earth and have fixed boundaries for determining satellite communication service. Although non-geosynchronous orbit (NGSO) satellites, such as the LEO satellites referenced above, rapidly move around the Earth, the moving footprint of the satellite does not change the location of the Earth-fixed cells.

An advantage provided by using cells having boundaries that are fixed to an Earth-based grid is realized when a ground terminal being served by a communication beam in one satellite must switch to another communication beam in the same satellite or to a second satellite because the first is moving out of range. With satellite-fixed cells, this communication "hand-off" involves assigning the ground terminal a new communication channel with the new beam or new satellite. This assignment process takes time and consumes processing capacity at both the terminal and the satellites. It also places the current communication link in jeopardy of blocking, call interruption, and call dropping if an idle communication channel in the next servicing beam or satellite is not available. Earth-fixed cell methods address the hand-off problems noted above by allocating communication channels (frequency, code, and/or time slots) on an Earth-fixed cell basis. Regardless of which satellite or beam is currently serving a particular cell, the ground terminals in the cell maintain the same channel assignments.

In any event, previous architectures for broadband NGSO satellite systems required hundreds of satellites that collectively generated thousands of beams to serve thousands of Earth-fixed cells. The satellites further required electronically-steered phased array or multi-beam array antennas, which are complex and expensive. The present invention is directed to solving the foregoing problems and other shortcomings in the prior art by providing a satellite data communication system having a scalable architecture that provides incremental global broadband services.

SUMMARY OF THE INVENTION

The present invention provides a scalable satellite data communication system that provides incremental global broadband services using Earth-fixed cells. For example, in one implementation of the invention, a suitable system may begin with a deployment of less than 20 satellites that initially serve 10 Earth-fixed cells. The present invention has the flexibility to incrementally increase the number of Earth-fixed cells that are served, with minimal constraints on the relative locations of the cells on the Earth, by adding satellites of potentially greater complexity to the system.

Where previous satellite communication system architectures required continuous service to Earth-fixed cells, a system constructed according to the present invention may also provide non-continuous service to selected Earth-fixed cells. The non-continuous service may be provided based on user demand and satellite availability. Scheduled non-continuous service is particularly advantageous for bulk data transport services. The present invention provides the capability of scheduling service in particular Earth-fixed cells for durations up to a limit depending on the satellite constellation parameters and constraints on the allocation of communication resources.

Furthermore, where previous satellite system architectures required complex electronically-steered phased array or multi-beam array satellite antennas (which the present invention may use), the present invention may also be implemented using simple mechanically-steered satellite antennas. In a basic form, satellites may be constructed with a single mechanically-steered transmit/receive antenna. The beam formed by the antenna is pointed to cover a selected Earth-fixed cell with a user terminal and a gateway. The pointing can be either continues or discrete.

Another advantage of the present invention is that satellites may be added to the satellite data communication system to incrementally increase the service coverage provided by the system. The satellites added to the system do not need to be identical to the satellites already in orbit. More complex satellites with multiple antennas may be added to increase the service coverage at a greater rate. Backward compatibility with existing user terminals is achieved by maintaining the same satellite communication interface as the already-deployed satellite constellation.

When a sufficient number of satellites are properly arranged in the satellite constellation, a system of the present invention may provide communication hand-off from one satellite to another when one satellite is no longer able to cover a selected Earth-fixed cell. The ability of a satellite to cover a selected Earth-fixed cell is determined by the elevation mask angle for the ground terminal, the location of the cell on the Earth's surface, and the location of the satellite in orbit.

Scheduled service may also be provided in circumstances where the number of available satellite antenna beams exceeds the number of Earth-fixed cells that can be continuously covered by the satellite constellation. These "temporarily uncommitted" beams can be advantageously used to provide communication coverage to selected Earth-fixed cells on a temporary scheduled basis.

A system constructed according to the present invention has many benefits. For example, satellites can be kept technologically simple and lower in weight, reducing the overall cost of the system. Marketing, service providers and user terminal manufacturers may benefit from a smaller and more focused satellite deployment. Furthermore, the service offerings provided by the system may be tailored to meet the needs of each Earth-fixed cell that is served.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
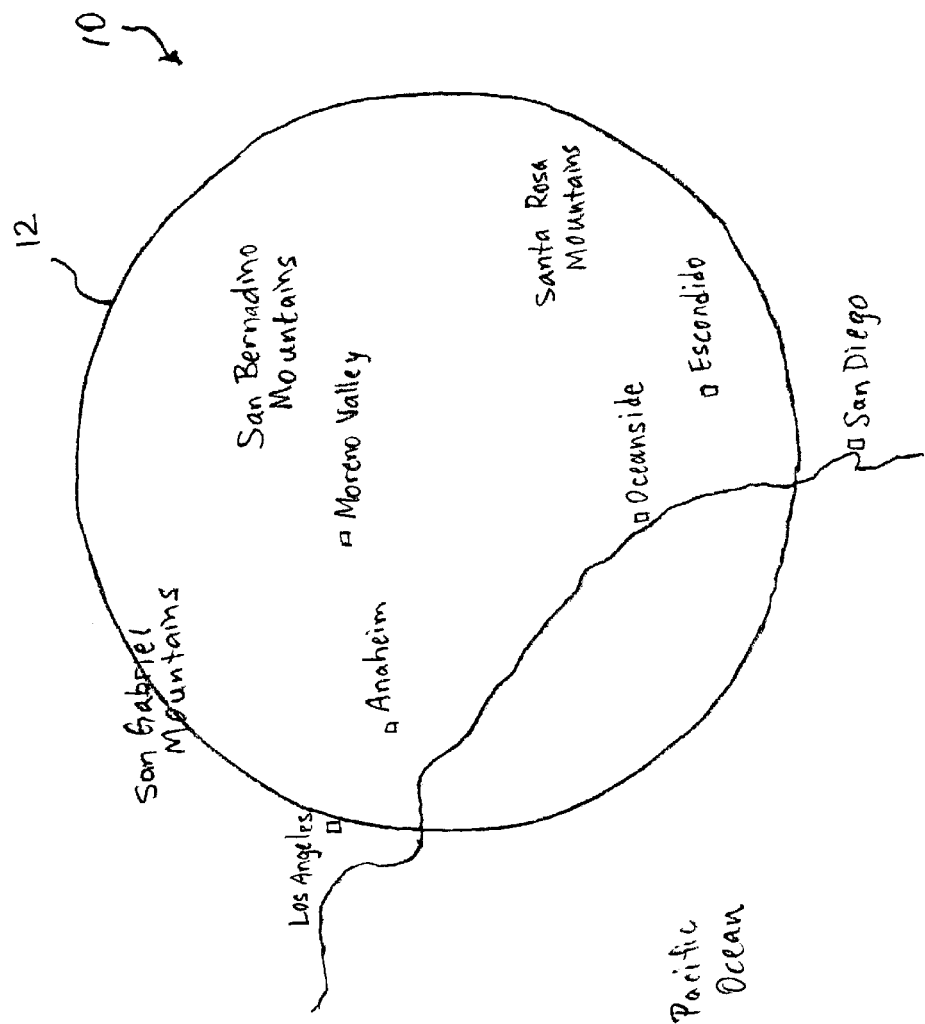
FIG. 1 is a pictorial diagram showing an area covered by an Earth-fixed cell situated over the Los Angeles Basin.

A satellite data communication system of the present invention may be viewed as having three principal physical segments: a user terminal segment, a space segment, and gateway segment. The user terminal and gateway segments are located in Earth-fixed cells defined on the Earth's surface. Satellites in the space segment facilitate communication of data between user terminals and their associated gateway terminals in the user terminal and gateway segments. Prior to discussing further details of these segments and the operation of a satellite data communication system constructed according to the present invention, a brief description of partitioning processes suitable for use in defining Earth-fixed cells is warranted.

Partitioning of the Earth's surface into Earth-fixed cells may be complete or incomplete. Complete partitioning means that the entire Earth's surface has been partitioned into cells. Incomplete partitioning results when Earth-fixed cells are defined for only a fraction of the Earth's surface.

An incomplete partitioning can be connected or non-connected. A connected partitioning permits one to move along the Earth's surface from an Earth-fixed cell to any other Earth-fixed cell without moving through a geographic location that is not contained within an Earth-fixed cell. A non-connected partitioning is one in which it is impossible to move along the Earth's surface from an Earth-fixed cell to another Earth-fixed cell without moving through a geographic location not contained within an Earth-fixed cell. Further, a sparse partition is one in which no Earth-fixed cell is adjacent to any other Earth-fixed cell.

One example of a complete partitioning of the Earth's surface into Earth-fixed cells is obtained by first tessellating a sphere inscribed within the Earth's surface with rectangular hexagons. The cell boundaries of the hexagons are projected to the Earth's surface using a line from the center of the Earth. Another example of complete partitioning is obtained by dividing the Earth's surface into an even number of bands of latitude and dividing each band into a number of trapezoids. The number of Earth-fixed cells in each band is approximately proportional to the cosine of latitude at the band center.

An example of an incomplete connected partitioning is obtained by selecting a latitude X, where X is greater than 0 degrees and less than 90 degrees. An integer N greater than 1 is also selected. The lines of latitude at X degrees North and X degrees South are divided into N equal-aligned segments. The cell boundaries are finally constructed by connecting the North and South segments with lines of longitude.

An incomplete non-connected partitioning may also be obtained by defining Earth-fixed cells that encompass only particular geographical locations, such as cities. For example, Earth-fixed cells may be centered on cities, such as London, New York, Moscow, and Bombay, with the cell boundaries being defined as the locally legally-recognized borders of the cities. Another example of an incomplete non-connected partitioning is obtained by centering an Earth-fixed cell on a specific geographic location. The Earth-fixed cell may be uniform in shape, e.g., circular, with a specified radius, e.g., 200 kilometer radius.

FIG. 1 illustrates one exemplary embodiment of an Earth-fixed cell having a defined shape and centered on a specific location. In FIG. 1, an Earth-fixed cell 10 having a circular border 12 is shown situated over the Los Angeles Basin. As described in greater detail below, a suitable satellite data communication system according to the present invention may provide 500 MHz of Ka-band uplink spectrum and 500 MHz of Ka-band downlink spectrum to be shared by user terminals located within the boundaries of the Earth-fixed cell 10. Also as described below, the service coverage of the Earth-fixed cell 10 may be continuous or non-continuous.

Figure 2:
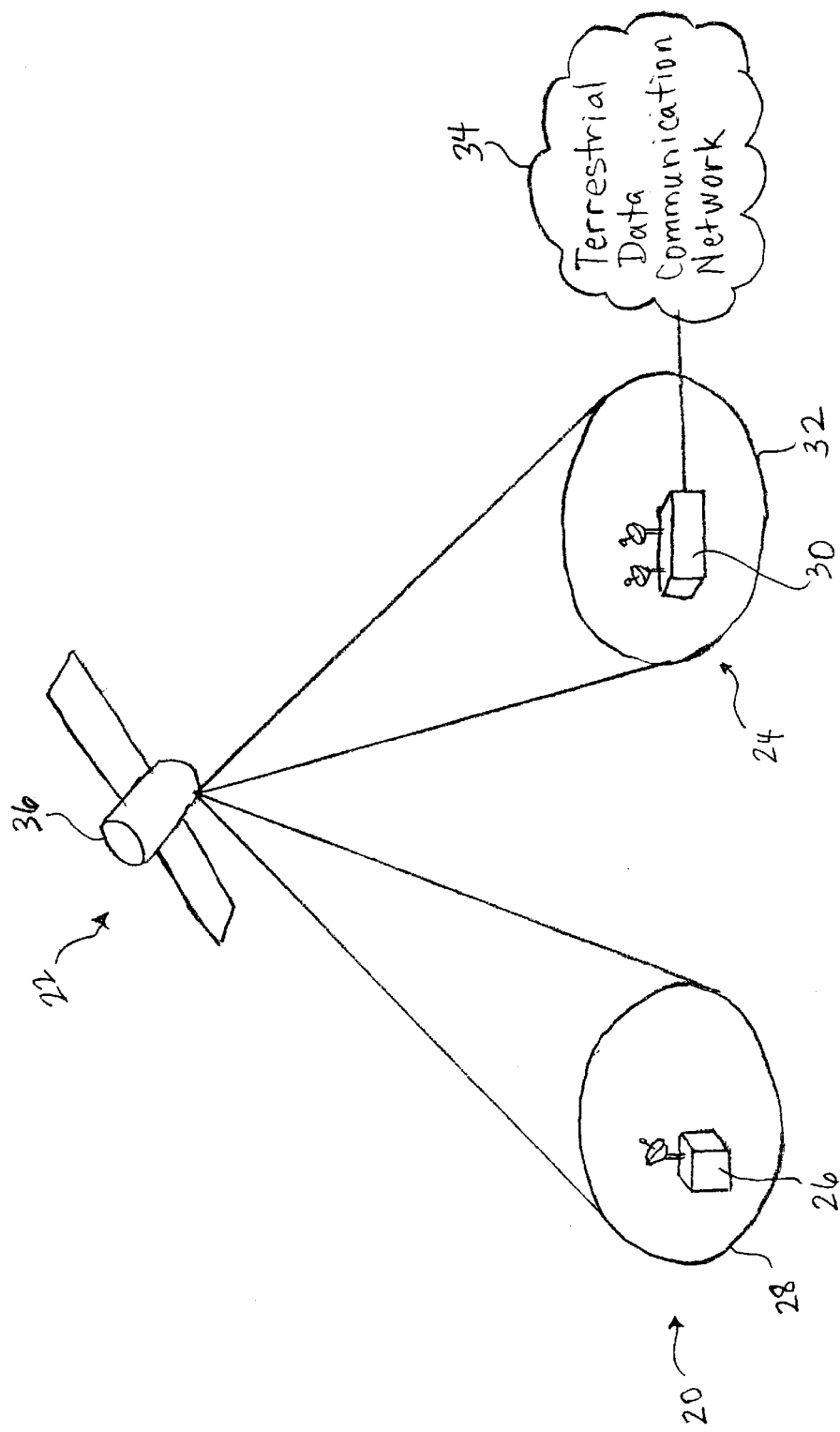
FIG. 2 is a pictorial diagram of a satellite data communication system of the present invention.

As noted above, a satellite data communication system of the invention may be conceptually divided into three segments. FIG. 2 illustrates a user terminal segment 20, a space segment 22, and a gateway segment 24. The user terminal segment 20 includes one or more user terminals 26 that are located on the Earth's surface. The user terminals 26 are located within an Earth-fixed cell 28. Earth-fixed cells that include user terminals 26 are also referred to herein as "service cells." The service cell 28 may, for example, have the properties of the Earth-fixed cell 10 shown in FIG. 1.

The space segment 22 is comprised of one or more satellites 36 in non-geosynchronous orbit (NGSO), such as medium Earth orbit (MEO) and/or low Earth orbit (LEO) satellites. The one or more satellites 36 are organized in a constellation of satellites that provides two-way data communication between user terminals 26 in the user terminal segment 20 and gateway terminals 30 in the gateway segment 24.

The gateway segment 24 includes one or more gateway terminals 30 (also referred to herein as "gateways"). The gateways 30 are located on the Earth's surface within an Earth-fixed cell 32. As shown in FIG. 2, gateways 30 are connected to a terrestrial data communication network 34, such as the Internet. The terrestrial data communication network 34 may include one or more public or private networks. The satellite data communication system thus provides user terminal access to the terrestrial data communication network 34 and vice-versa by way of the space segment 22 and gateway segment 24.

The location of each gateway on the Earth's surface may depend on a number of factors, including (1) proximity to network backbones to guarantee data speed and integrity, and (2) proximity to one of the Earth-fixed cells being served by the gateway 30, such as the service cell 28. For each service cell 28, there is typically one active satellite 36 and one active gateway 30, though multiple satellites and multiple gateways may be associated with and serve the service cell 28. As a result, the gateway 30 may be located near the service cell 28. Nevertheless, the following considerations should be taken into account when determining how close to locate the gateways and the user terminals. One implementation of the invention described herein uses 500 MHz of Ka-band spectrum for each of the uplink and downlink data communication bands. If the full 500 MHz of spectrum is utilized in each band, the associated gateway 30 should not be located closer than 750 kilometers to avoid interference. If the user terminals 26 and gateway 30 are co-located (i.e., in the same Earth-fixed cell), they must share the same 500 MHz of spectrum. In that circumstance, the separation requirement is no longer needed.

If the service cell 28 requires less than 250 MHz of spectrum, then its associated gateway 30 can be located closer to, or possibly within, the service cell 28. The 500 MHz band is split so the user terminals 26 and gateway 30 communicate via the satellite 36 using different frequencies. In this example, the satellite 36 may generate two antenna beams: one antenna beam directed towards the service cell 28 and the other antenna beam directed toward the gateway 30 (i.e., to encompass the cell 32 in which the gateway 30 is located). Control commands from ground stations, such as the gateways 30, may be communicated to the satellite 36 to direct the manner in which the antenna beams are pointed and the number of transponders that are allocated between the antenna beams. The satellites 36 may be constructed to provide continuous service to the user terminals 26 by providing communication hand-off from one satellite to another.

One initial satellite constellation suitable for the space segment 22 may have the characteristics shown in Table 1.

TABLE 1

| Constellation Parameters | |
|---|---|
| Altitude | 10,930 km |
| Inclination | 46.7° |
| Total Number of Satellites | 18 |
| Number of Planes | 3 |
| Number of Satellites per Plane | 6 |
| Satellite Spares | 3 (1 in each plane) |
| Walker Delta Phase Factor | 0 |
| Minimum user terminal elevation angle | 35°–40° |
| Minimum gateway elevation angle | 25° |

Figure 3:
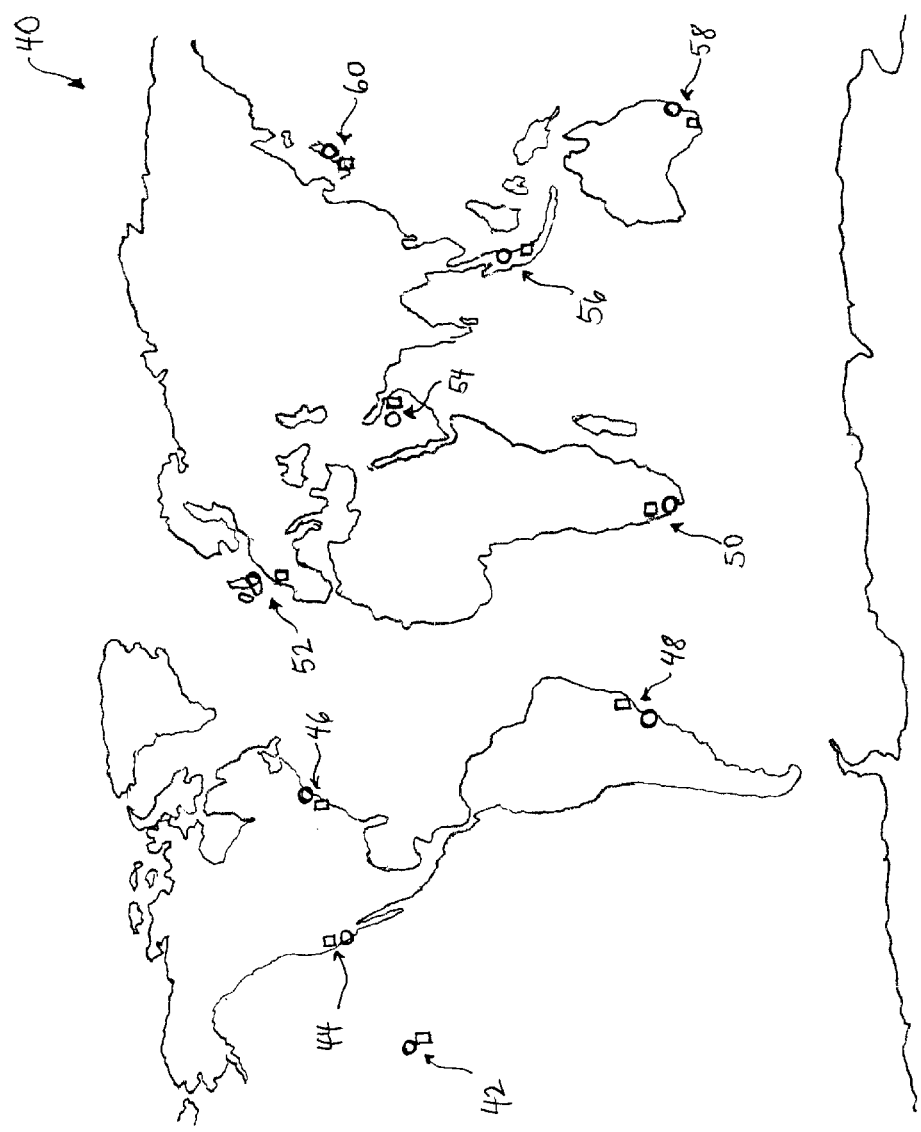
FIG. 3 is a pictorial diagram of a coverage map for one exemplary embodiment of the invention with ten service cell/gateway pairs located worldwide.

An initial deployment of a satellite constellation for use in the present invention may be configured to serve a determined number of cells, e.g., 10 Earth-fixed cells, worldwide. FIG. 3 illustrates a coverage map 40 with exemplary locations for ten service cells and associated gateway cells. The circular spots denote service cells that contain the user terminals while the square spots represent cells containing the gateways. In FIG. 3, four service cell/gateway pairs in the Americas are illustrated at reference numerals 42, 44, 46 and 48. Service cell/gateway locations in Africa and Europe are shown at reference numerals 50 and 52. In the Middle East, Asia, and Australia, service cell/gateway locations are as indicated by reference numerals 54, 56, 58, and 60. Depending on the number of satellites in the satellite data communication system, the elevation masks required for communication with the user terminals and the gateways, and the communication frequencies used, the initial locations of the service cell/gateway pairs may be separated by a certain distance, e.g., 2000 kilometers, from each other.

It should be understood that a system of the present invention with even a single satellite can provide coverage to some, or all, of the Earth-fixed cells. When fewer satellites are included in the satellite constellation, communication coverage for each service cell is generally provided on a non-continuous basis. In that regard, communication service may be scheduled for each service cell, which is particularly advantageous for bulk data transport services described in greater detail below. Moreover, bulk data transport services may provide early entry revenue generation and incremental revenue growth for the satellite data communication system.

The total coverage capacity for the satellite data communication system may increase proportionally as additional satellites are placed in orbit. Depending on the orbital relationship of these satellites, this capacity can be used to increase the scheduled coverage duration in some Earth-fixed cells, increase the number of Earth-fixed cells that receive scheduled coverage, or some combination of the two. Furthermore, the present invention advantageously accommodates the addition of higher complexity satellites (e.g., with multiple beam coverage) while retaining backward compatibility with the existing satellite constellation. Multi-beam satellites added to the system increase the coverage capacity of the satellite data communication system.

Once the satellite constellation of the satellite data communication system reaches a critical capacity, a subset of Earth-fixed cells may receive service coverage on a continuous basis. These cells are also referred to herein as "active" Earth-fixed cells or the "active subset" of Earth-fixed cells. The active subset need not remain static. It can be modified in response to market, economic, or regulatory forces. The ability to change the active subset of cells can be used to respond to unexpected demand, such when natural disasters or military conflicts occur.

As the capacity of the satellite constellation increases beyond a critical size, the number of Earth-fixed cells that may be covered on a continuous basis also increases. Alternatively, some Earth-fixed cells may be covered by multiple satellites. Multiple coverage can be used to increase the communication capacity of the system where needed, provide path diversity, provide enhanced reliability, or any combination thereof.

Because NGSO satellites move rapidly around the Earth, each satellite serving an Earth-fixed cell will eventually orbit out of range of the Earth-fixed cell. Where a system of the present invention includes a constellation of multiple satellites, the system is preferably configured to hand-off communication from one satellite to another as one satellite moves out of range and another enters into range of an Earth-fixed cell. The hand-off process may operate on a regular basis and be configured to provide one or more Earth-fixed cells with continuous converge.

To preclude the need for additional components in user terminals, such as dual receivers and power amplifiers, the satellite data communication system is preferably designed to operate in a "break before make" mode for communication hand-off. In a break before make mode, a user terminal ends data communication with the first satellite and breaks contact with the satellite. The user terminal then acquires the second satellite coming into range and begins data communication with the second satellite. The total time for a break before make operation is preferably less than 10 milliseconds so as to appear transparent to the user.

The present invention also extends the Earth-fixed cell concept by enabling the location of one or more Earth-fixed cells to be dynamically changed as needed. For example, an Earth-fixed cell may be centered on one or more user terminals that are affixed to ships moving across the ocean. The satellite data communication system may dynamically relocate the Earth-fixed cell according to the motion of the user terminals that are moving across the Earth's surface. When an Earth-fixed cell is relocated, the location information may be communicated through the satellite communication system so that the user terminal and satellite antennas are steered appropriately.

A significant number of terrestrial data communication networks, such as the Internet, use Internet Protocol (IP) for data transport. In reference to the configuration shown in FIG. 2, a user terminal 26 may receive IP packets from a user's computer via a network interface (e.g., Ethernet). An indoor portion of the user terminal then reformats the IP packets for satellite transmission, performs packet segmentation, encapsulation, encryption, coding, and modulation to produce an intermediate frequency (IF) signal. The IF signal is transmitted, e.g., via a cable, to an outdoor portion of the user terminal that includes the antenna. The IF signal is translated to the Ka frequency band and transmitted to the steerable antenna that is tracking the satellite 36 currently serving the user's service cell. Known technology for generating and transmitting data signals from a ground terminal to a satellite may be used in this regard.

The satellite 36 is preferably configured to have a "bent-pipe" configuration in which the uplink signal received from the user terminal 26 is redirected back to the Earth toward the associated gateway 30. The serving satellite receives the uplink signal via the satellite's steerable antenna that is tracking the user's service cell. A transponder converts the signal's uplink frequency to the downlink frequency, amplifies it and sends the signal to the service cell via the steerable antenna that is tracking the gateway assigned to the service cell.

At the gateway 30, the signal carrying the IP packets is received at the gateway antenna tracking the serving satellite, demodulated, decoded, decrypted, and reassembled as necessary into IP packets. The IP packets are then routed by the gateway 30 to the terrestrial data communication network 34 for communication to the final destination.

Data transmission from the user terminal 26 to the terrestrial data communication network 34 via the gateway 30 is referred to herein as a reverse communication link. Data received by the gateway 30 from the terrestrial data communication network 34 for transmission to the user terminal 26 is transmitted via a forward communication link. Forward link transmission (gateway to user terminal) roughly follows a path opposite to that described above for reverse link transmission.

Various classes of user terminals 26 may be used to support the diversified needs of users in each service cell. In one exemplary implementation of the invention, four classes of user terminals are defined, e.g., Class I, Class II, Class III and Class IV user terminals. A Class I user terminal, for example, may constitute a basic form of user terminal that is most commonly used. A Class I user terminal may use a low-cost, low profile antenna that is easy to install and is unobtrusive.

In this exemplary implementation, Class I user terminals are preferably constructed so that they can be sited anywhere having clear view of the sky above a specified elevation. Different user terminal elevations may be required for different latitudes in which the user terminals are located. After initial installation, the user terminal antenna may direct itself using a satellite beacon/control signal and point itself to the serving satellite. The user terminals 26 may interface with a user's hardware (i.e., computer or computer network) via standard communication interfaces, such as a 10Base-T, 100Base-T, USB, Ethernet or other type connection.

Other classes of user terminals, e.g., Classes II, III, and IV, may be defined to provide equipment capable of higher transmission rates and/or better link availability. Exemplary parameters for the four classes of user terminal in this example are provided below in Table 2.

TABLE 2

User Terminal Performance Parameters

|  | EIRP [dBW] | G/T [dB/K] | Minimum Data Rate [Mbps] | Maximum Data Rate [Mbps] | NYC Availability [%] |
|---|---|---|---|---|---|
| Class I | 31.8 | 2.9 | 0.256 | 0.512 | 99.5 |
| Class II | 37.8 | 5.9 | 1.024 | 2.048 | 99.5 |

TABLE 2-continued

User Terminal Performance Parameters

|  | EIRP [dBW] | G/T [dB/K] | Minimum Data Rate [Mbps] | Maximum Data Rate [Mbps] | NYC Availability [%] |
|---|---|---|---|---|---|
| Class III | 46.9 | 9.2 | 2.048 | 8.192 | 99.7 |
| Class IV | 59.9 | 15.6 | 10.24 | 51.2 | 99.9 |

Figure 4:
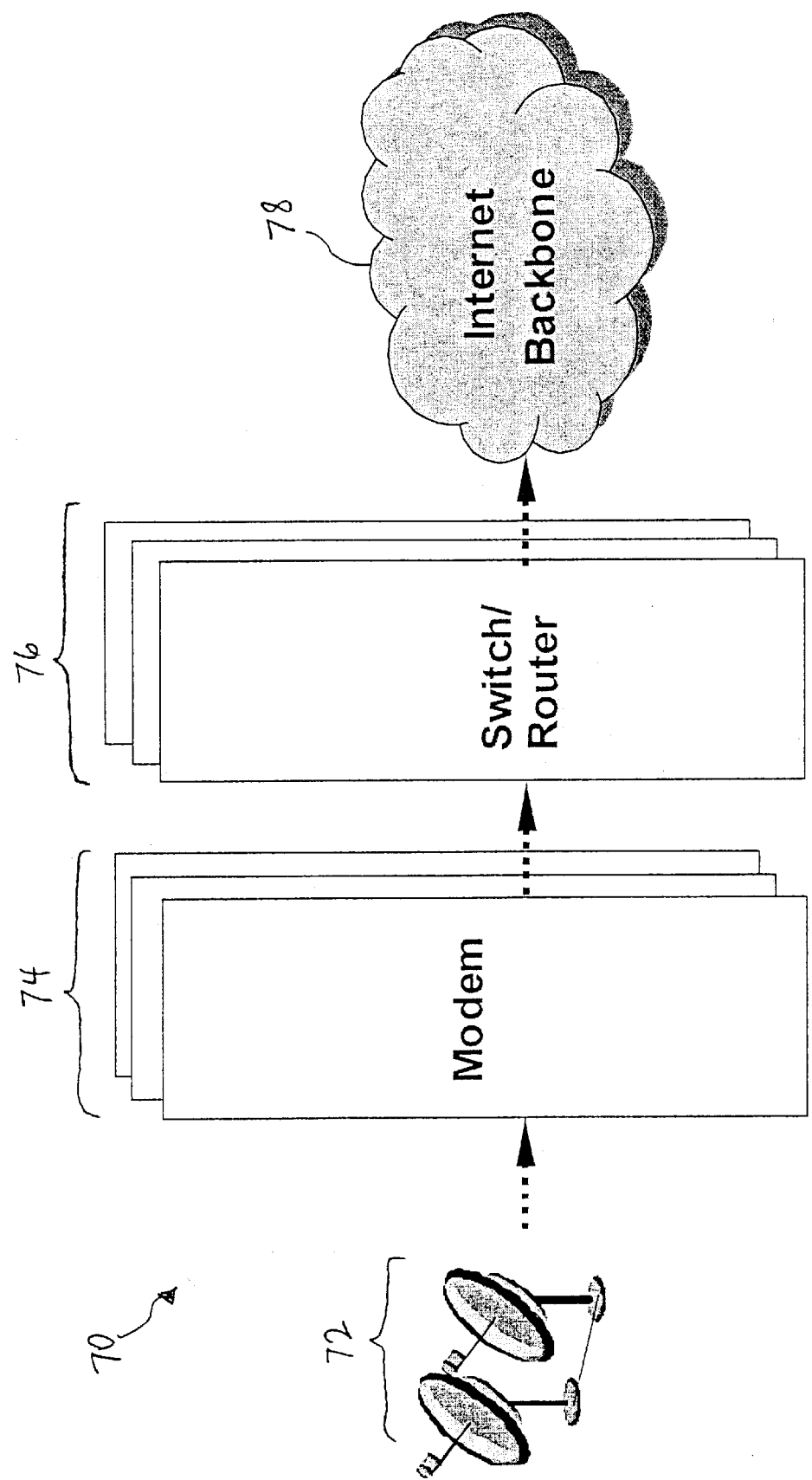
FIG. 4 illustrates major components of a gateway that may be used in the present invention.

FIG. 4 illustrates major components of one example of a suitable gateway 70. The gateway 70 as shown includes multiple antennas 72, multiple modems 74, and multiple routers 76. Downlink signals received at the antennas 72 from a satellite are demodulated and decoded by the modems 74 and switched and routed to the terrestrial data communication network 78, via the routers 76. The terrestrial data communication network, in this example, is an Internet backbone. The antennas 72 may be constructed relatively small (e.g., 1.2 meters in diameter) and can be located in cities. Moreover, to reduce latency, the gateway 70 may be located in places, such as major cities, in which access to the Internet backbone is available.

In circumstances where a gateway is not co-located with the user terminals in the service cell, the service cell may require more than one associated gateway to insure that there is always at least one gateway within the same satellite footprint as the service cell. In this case, as the serving gateway passes out of the satellite footprint, the service cell is handed-off to another gateway in the satellite footprint. For these multi-homed service cells, the two (or more) associated gateways are preferably interconnected by terrestrial facilities. Gateways may operate down to a lower elevation angle than user terminals, which increases the size of the satellite's gateway coverage footprint.

Preferred embodiments of a gateway have at least three satellite communication antennas with associated RF equipment: one in use with the current serving satellite, one acquiring or tracking the next satellite, and one standby spare. In some climates, antenna site diversity can be used to improve availability. One exemplary configuration uses two antenna sites, separated by a distance, e.g., 30 km, each with at least two antennas for use to communicate with the current satellite and to track the next satellite. The output power and aperture diameter (and therefore the EIRP and G/T) of the gateway antennas can vary to compensate for rain attenuation in different climate zones. One exemplary gateway configuration uses a 1.8 m antenna with 40-watts output power per channel.

Figure 5:
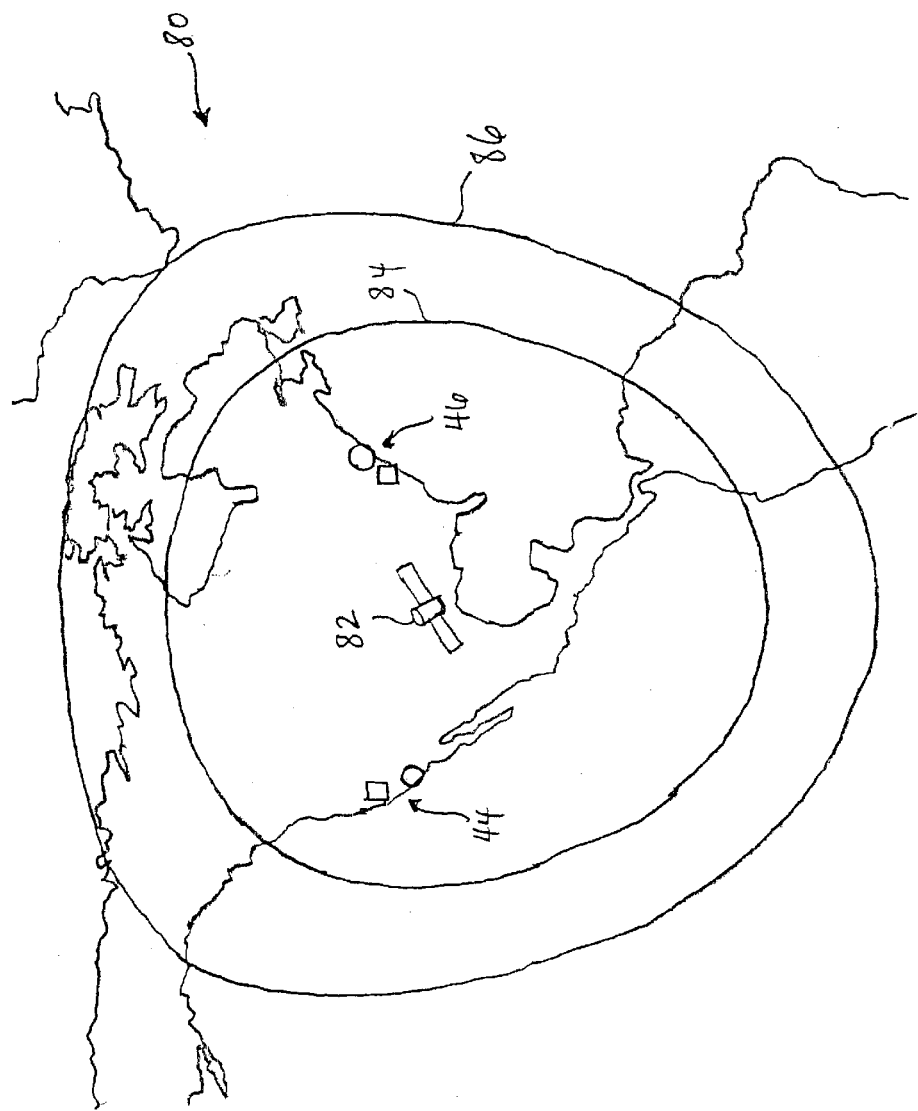
FIG. 5 is a pictorial diagram of satellite coverage for both a user terminal elevation mask and gateway elevation mask having different mask angles.

FIG. 5 illustrates an exemplary satellite coverage map 80 for both a user terminal mask angle (inner ovoid 84) and gateway mask angle (outer ovoid 86). A mask angle is the minimum elevation above the horizon which a ground terminal is able to communicate with a satellite. A user terminal mask angle in one example of the invention is 40°, while a gateway elevation mask is 25°. Other implementations of the invention may employ other mask angles. A currently preferred embodiment of the invention uses a user terminal mask angle of 20° and a gateway mask angle of 15°.

For a user terminal and a gateway to communicate, both must be in the communication footprint of the same serving satellite. The satellite altitude and the mask angle affect the size of the satellite communication footprint. To insure that a user terminal and gateway share the same satellite footprint for a satellite 82, the gateway preferably operates with a lower gateway elevation angle. A lower gateway elevation mask results in a coverage footprint being larger than the coverage footprint for a user terminal having a higher elevation mask, as shown in FIG. 5. A user terminal and a gateway are guaranteed to be within the coverage area of the same satellite if the distance between them does not exceed the difference between these footprint radii. If the separation between a user terminal in a service cell and a gateway does exceed this distance, it may be necessary to associate the service cell with more than one gateway to insure continuous coverage.

Further, gateways 30 (FIG. 2) may be connected to each other and to the terrestrial data communication network 34 by way of known data communication conduits, including dedicated fiber optic cables, public switched telephone network links, private or leased lines, virtual private networks (VPNs), terrestrial-based microwave links, GEO VSATs, Internet links, or by multiple hops through the satellite network. A single gateway can also be associated with multiple Earth-fixed cells and provide service to user terminals located in those Earth-fixed cells.

One significant feature of the present invention is that it provides a scalable system that enables incremental growth in global broadband services. By increasing the number of satellites in the satellite communication system, as well as the performance characteristics of the satellites (e.g., beam count), the number of Earth-fixed cells served by the satellite communication system can be dramatically increased. One possible growth scenario is described below in Table 3.

TABLE 3

Space Segment Phases

|  | Satellites | Beams Per Satellite | Total Active Served Cells |
|---|---|---|---|
| Initial Rollout | 18 | 1 | 10 |
| Additional Dual-Beam Satellites | 18 | 2 | 30 |
| Additional Multi-Beam Satellites | 18 | 16 | 200+ |

The initial space segment in Table 3 includes eighteen satellites, each with a single service beam. This initial deployment is configured to serve a total of 10 Earth-fixed cells. The second set of satellites added to the system in this example include two service beams per satellite and are each capable of serving two Earth-fixed cells at a time. As a result, the total number of service cells grows to 30 (i.e., the initial 10 cells plus 20 cells serviceable by the newly-added satellites). At a further stage, multi-beam satellites capable of serving 16 cells each may be added to the system, providing service to hundreds of cells in which millions of users may be located.

Two broad categories of service that are advantageously provided by a satellite data communication system of the present invention are (1) interactive broadband communications and (2) data transport services. Interactive broadband communications, which are likely to constitute the primary service of the system, are provided to user terminals inside designated service cells. Data transport services, which also may be provided to user terminals inside the designated service cells, may further be provided to user terminals outside the designated service cells on a scheduled basis. These service offerings may, and probably will, change over time. As such, the flexibility provided by the system of the invention is particularly desirable. Additionally, this flexibility enables different service offerings to be provided to different service cells.

Another strength of a system constructed according to the present invention is that it provides high quality, cost competitive broadband access to the Internet or other wide area network to users in remote locations. The system's broadband connectivity characteristics compare favorably with DSL, cable modem, and geosynchronous orbit satellite services. Moreover, time delay, or latency, through the system is much lower when compared with more traditional broadband satellite communication systems that use geosynchronous satellites. This is largely in part because the satellites in the space segment 22 (FIG. 2) operate at about ⅓ the altitude of a geosynchronous satellite. Table 4 below displays typical round-trip communication time, in milliseconds, to and from a user terminal for a system of the present invention and for a geosynchronous satellite system.

TABLE 4

Round-Trip System Latency

| | Present System | GEO System |
|---|---|---|
| User terminal to satellite (uplink) | 40 ms | 120 ms |
| Satellite to gateway (downlink) | 40 ms | 120 ms |
| Gateway to Internet | 0 ms | 0 ms |
| Total Round-Trip Latency | 160 ms | 480 ms |

As a general rule, data transmission to and from individual users is typically bursty, asymmetric, and unpredictable. However, in the aggregate, data transmissions generated in each service cell may be projected in advance and used to plan satellite transponder activation times and power allocation. Reference data transmission profiles for a service area and for servicing satellites are also used to estimate solar array and battery requirements for the satellites.

In one suitable embodiment of the invention, a satellite payload includes two antennas, each of which may have an equivalent aperture (e.g., 71 cm). Preferably, the two antennas are independently steerable and capable of simultaneously transmitting data to and receiving data from Earth-based terminals. The satellite antenna for uplink data transmission may generate, for example, a communication footprint of approximately 200 km diameter at nadir. In order to minimize network interruptions, the antenna beam is preferably constructed so that it can be repointed to a new location, preferably within a short amount of time. Moreover, it can preferably be pointed a determined number of degrees from boresight to meet a minimum user terminal elevation for bulk data delivery service, where applicable.

As noted earlier, the satellite antenna payload preferably uses a "bent-pipe" configuration, which generally minimizes the cost and complexity of the satellite. The satellite antenna components include low noise amplifiers, block down converters to convert signals to an intermediate frequency (IF), block up converters to convert the signals to radio frequency (RF), and a switchable bank of filters. The filter bank should be constructed to satisfy regulatory and national sovereignty issues with respect to communication signals, and also prevent renegade user terminals from using unallocated communication spectrum without authorization.

A satellite with two antennas as described above may point one antenna toward a gateway and the other antenna toward a service cell. Alternatively, the gateway and the user terminal may be co-located in the same service cell. In the latter circumstance, the same satellite antenna may serve both the gateway and the user terminals in the service cell by sharing the available spectrum. A switch matrix is used by the satellite to manage cross coupling of the two antennas.

To conserve power, one exemplary implementation of the invention uses a bank of five 50-MHz traveling wave tube amplifiers (TWTAs) covering a 250-MHz bandwidth. This bank of TWTAs enables the satellite to scale its power usage according to the current data traffic profile. The system takes advantage of traffic profiles in order to reduce the required power that the satellite data bus must deliver. Lower power requirements translate into lower satellite mass, which translates into lower overall system cost. The average satellite duty cycle is 55% compared to an average relative duty cycle of 25%. Reducing the required power during low periods of demand may result in a power reduction of over 50%.

In order to maximize frequency reuse, a user terminal and its associated gateway may share the same spectrum. In embodiments described above, the user terminal and the gateway may jointly use a 500 MHz spectrum. An exemplary embodiment locates the uplink and downlink spectrums at 28.6–29.1 GHz and 18.8–19.3 GHz, respectively. In Earth-fixed cells where less than 500 MHz is available, the signal transmissions may be tailored according to the available spectrum.

In order to transmit or receive uplink and downlink signals across a full 500 MHz of bandwidth in this example, sufficient angular separation between the two satellite antenna beams may be necessary. Furthermore, in order to minimize interference, the user terminals and the gateway preferably transmit uplink and downlink signals having orthogonal polarization. In one exemplary embodiment, the user terminals and gateway use right-hand circular polarization (RHCP) and left-hand circular polarization (LHCP), respectively, for uplink and downlink transmission. See FIGS. 6 and 7. In the event that it is not possible to locate the gateway sufficiently apart from the user terminal, the user terminal and the gateway may share the same spectrum. See FIG. 8.

Figure 6:
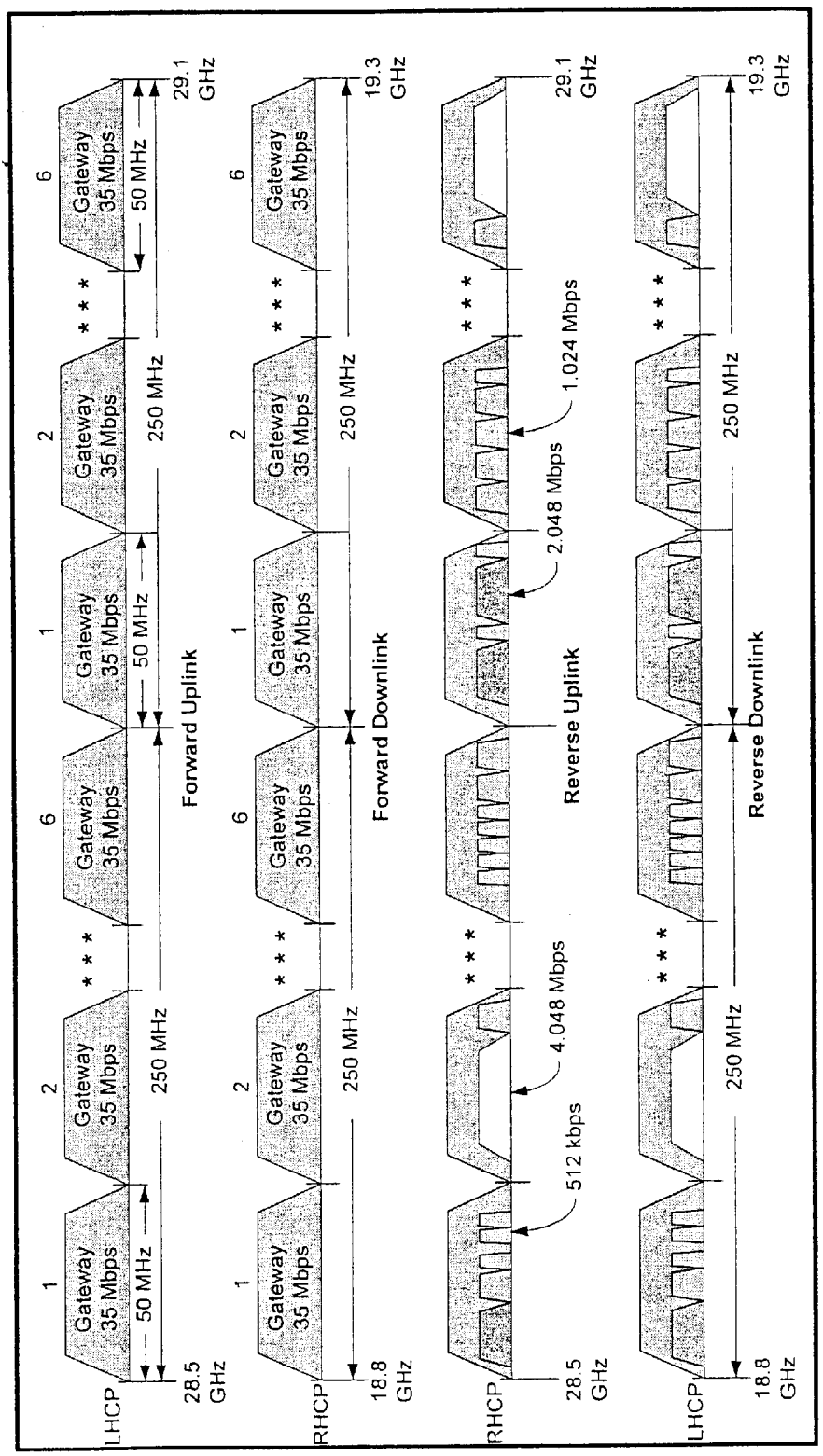
FIG. 6 is a diagram illustrating spectrum use in an exemplary embodiment of the invention with heavy data traffic.
Figure 7:
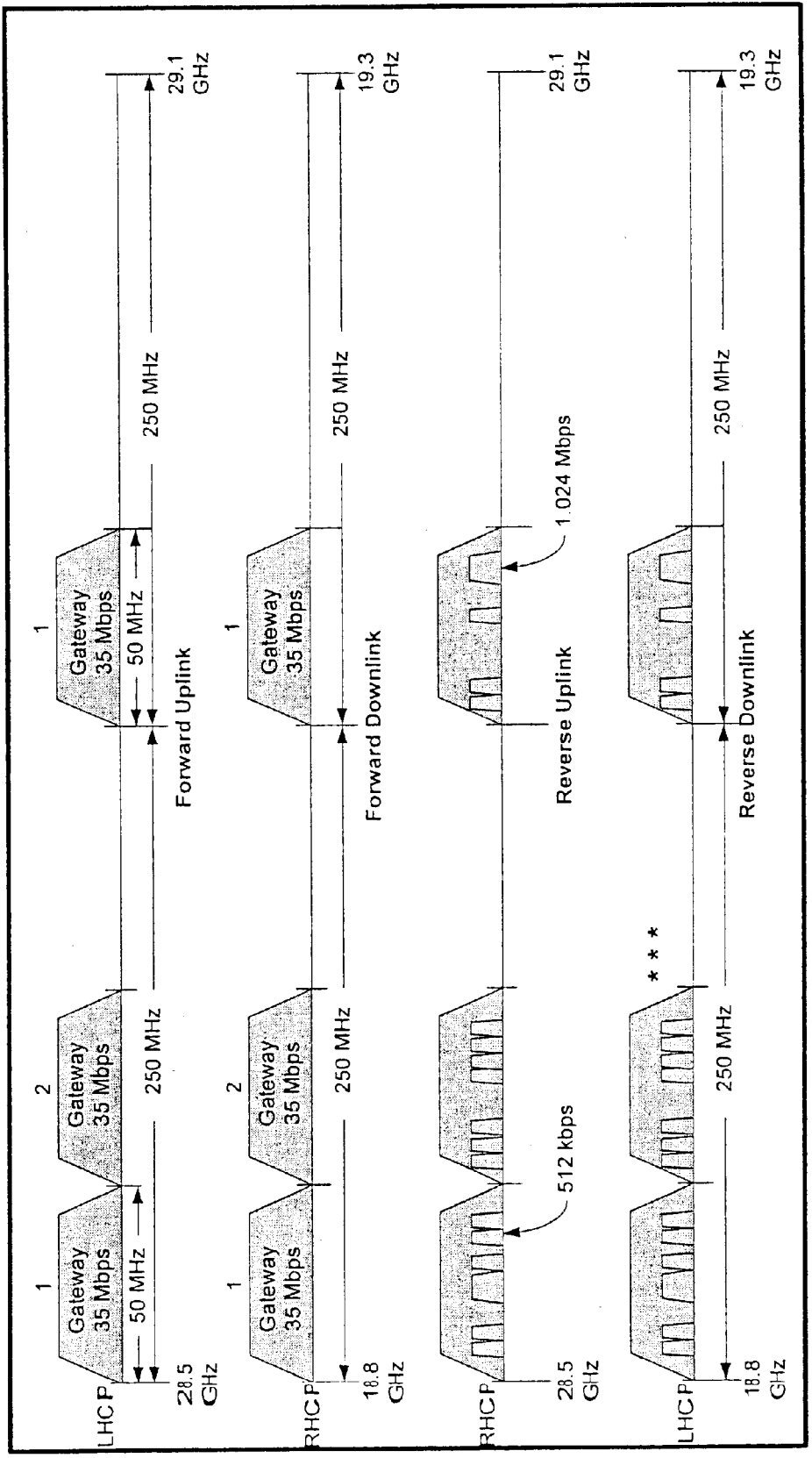
FIG. 7 is a diagram illustrating spectrum use in an exemplary embodiment of the invention with light data traffic.
Figure 8:
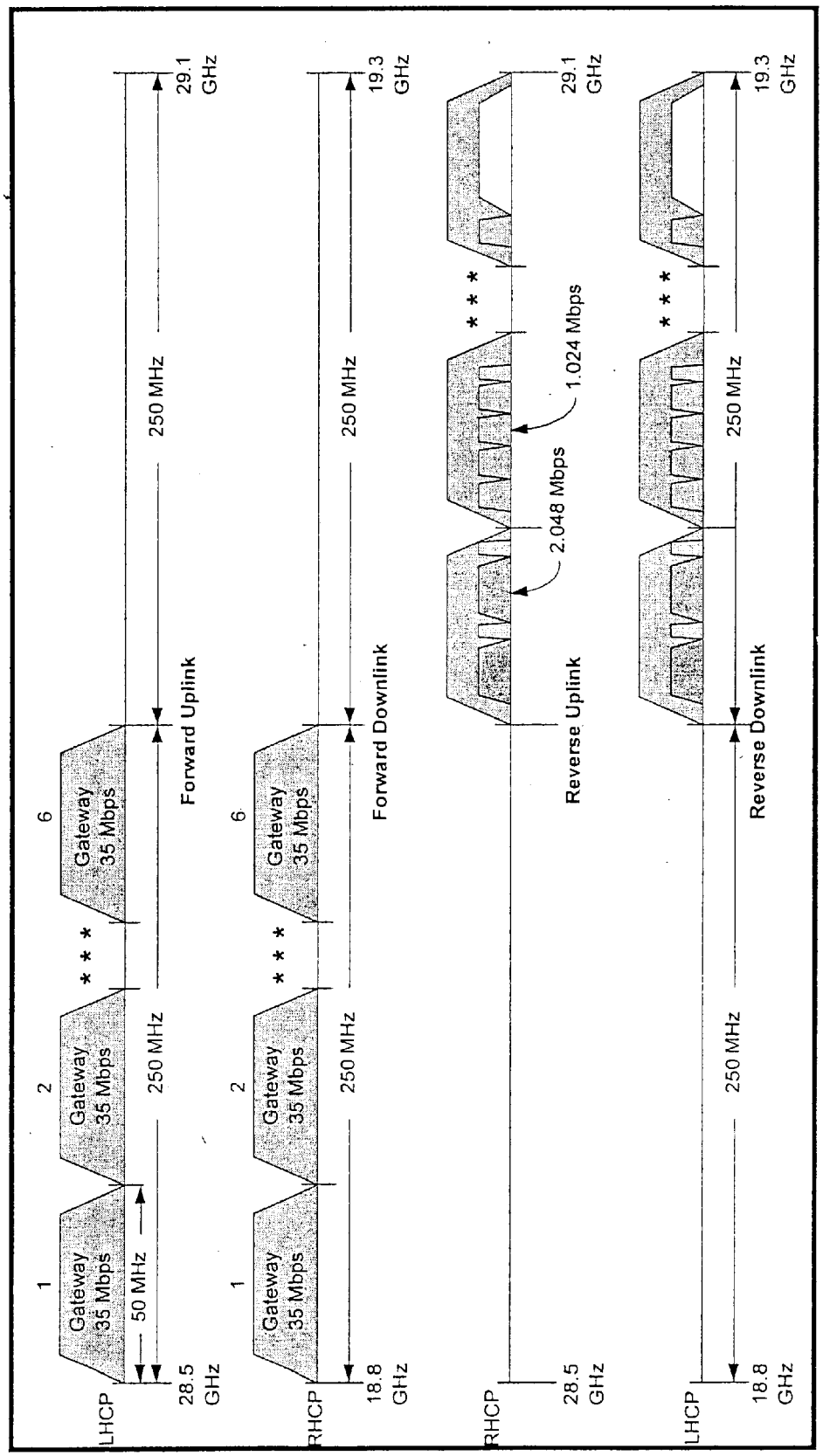
FIG. 8 is a diagram illustrating spectrum use in an exemplary embodiment of the invention wherein the spectrum is shared between a user terminal and a co-located gateway.

Each 250 MHz channel shown in FIGS. 6–8 may be divided into five 50-MHz channels. Each 50 MHz channel may be powered by a separate TWTA that can be turned on and off depending on data traffic demand. As shown in FIG. 6, when the service area and the gateway are heavily loaded with data traffic, all 50 MHz channels are used to serve the traffic. Inside each 50 MHz channel, the user terminals on the reverse data communication link can burst at various rates depending on environmental considerations, such as rain fade, and the class of user terminal involved. FIG. 7 illustrates an example of when a service cell and the gateway are lightly loaded. In this case, only certain 50 MHz channels are needed to carry the data traffic. Since only certain 50 MHz channels are activated, satellite power is conserved.

Data communication parameters and operational aspects of the satellite may be controlled by control signals generated within the satellite or within Earth-based terminals. For example, the gateways in the present invention may be assigned with the task of controlling the allocation of data communication resources. Depending on the communication protocols of the satellite data communication system, gateways may control resources in the frequency domain (i.e., assign communication channels in the frequency spectrum), control resources in the time domain (i.e., assign time slots for data communication), and/or control resources in the code domain (i.e., assign spreading codes).

Examples of a priority-based system and method of allocating resources for transmission of one or more data packets from a ground terminal to an NGSO satellite are disclosed in U.S. Pat. No. 6,366,761 entitled PRIORITY-BASED BANDWIDTH ALLOCATION AND BANDWIDTH-ON-DEMAND IN A LOW-EARTH ORBIT SATELLITE DATA COMMUNICATION NETWORK, assigned to the assignee of the present invention and incorporated by reference herein. Uplink bandwidth may be allocated based on a priority status assigned to the data packets to be transmitted to enable the data transmission to meet or exceed a user-selected quality of service. Different data packets in a data transmission may be assigned different levels of priority status. The '761 patent referenced above describes dividing uplink bandwidth into slots representing time and frequency which are allocated for transmission of data packets in accordance with the assigned priority status of the data packets. The patent also describes a bandwidth on-demand feature in which bandwidth can be allocated on request.

Where an Earth-based terminal, such as a gateway, is employed to control data transmission parameters and satellite operation, the Earth-based terminal may communicate with the satellite by either an "in-band" transmission or an "out-of-band" transmission. An in-band data transmission is generally more efficient because the control message is essentially piggy-backed with data communications already taking place (i.e., additional bandwidth allocation is not required). An out-of-band transmission may be necessary when the ground terminal does not have an existing bandwidth allocation to communicate with the satellite. An out-of-band transmission may, for example, involve transmitting data over a contention channel comprised of a communication frequency that remains open for unscheduled data transmissions. Of course, when using a contention channel, there is risk that the satellite or gateway will not successfully receive control messages if, for example, two or more control messages are simultaneously transmitted on the contention channel by different satellites or gateways. For that reason, it is preferred that the satellite or gateway confirm receipt of control messages by transmitting an acknowledgement signal.

Preferably, communication resource allocation also takes into account the hand-off of communication links from one satellite to another. Communication hand-off may be accomplished using a "break before make" process as described earlier. It may also be accomplished by directing data packets in a particular communication link to different queues for transmission to the different satellites.

In embodiments of the invention where resource allocation is performed in the satellites, the user terminals and gateways may transmit resource request signals to the satellite by either in-band or out-of-band transmission as described above. Resource allocation algorithms operating in the satellite may allocate time, frequency, and/or codes in the form of resource assignment data that is transmitted back to the requesting user terminal or gateway. Data structures and processes for managing the allocation of resources, particularly bandwidth on-demand, are described in the '761 patent referenced above.

In a currently preferred embodiment of the invention, the satellites are capable of autonomously performing some low-level operations such as attitude control and maintaining antennas pointed to designated locations. However, satellite and constellation operation is primarily controlled from a satellite control system (SCS) operating in connection with or within the satellite data communication system. For each satellite, the SCS generates a set of time-tagged commands that are transmitted to that satellite, which then executes each command at its designated time. These commands control the payload configuration, antenna pointing/tracking locations, etc. The satellite also generates data such as telemetry data and alarms that it transmits to the SCS. Telemetry, tracking and control systems (TTC) in the satellite data communication system provide the communication paths between the satellites and the SCS. During normal operations, a small portion of the Ka-band uplink and downlink spectrum is used to transmit TTC data on the satellite-gateway link. When the satellite is not in its normal operating mode, such as during satellite launch and deployment, and certain abnormal conditions, TTC data may be transmitted over a separate path using S-band spectrum and a separate set of ground stations. Communication between the SCS and the TTC systems in the gateways and/or other terrestrial facilities may use a terrestrial VPN.

Other system elements may include a network operations center (NOC) and business operation support systems. These systems support high-level network management and operations functions, including billing, provisioning, fault detection and reconfiguration, security management, service quality management, etc.

For maximum reliability, two physically separate NOCs may operate in an active-standby mode. Each NOC interfaces with the SCS and with the gateways. The active NOC provides the SCS with service locations and traffic demand profiles for the service cells, gateways and bulk data delivery terminals. The SCS generates satellite configuration commands, which it may send to the satellites via TTC systems. The SCS also sends to the NOC the satellite ephemeris updates and a schedule of satellite and transponder assignments for the gateways, service cells, and bulk data delivery operations. The NOC in turn passes the required information to the gateways. Network management responsibilities include remote monitoring and control of gateway and network systems, maintaining gateway and network status, performing fault detection, reconfiguration and recovery, monitoring network service quality, and configuration management.

In a currently preferred embodiment of the invention, the satellites use functionally equivalent bent-pipe communication payloads to relay communication channels with apparent transparency between user terminals and their associated gateways. Uplink transmissions operate within a frequency band of 28.6 GHz to 29.1 GHz, and downlink transmissions operate within 18.8 GHz to 19.3 GHz. The uplink and downlink bands are divided into four channels each, with a center-frequency separation of 125 MHz and a usable bandwidth of 115 MHz. Each uplink channel has a corresponding downlink channel separated by 9.8 GHz.

Figure 9:
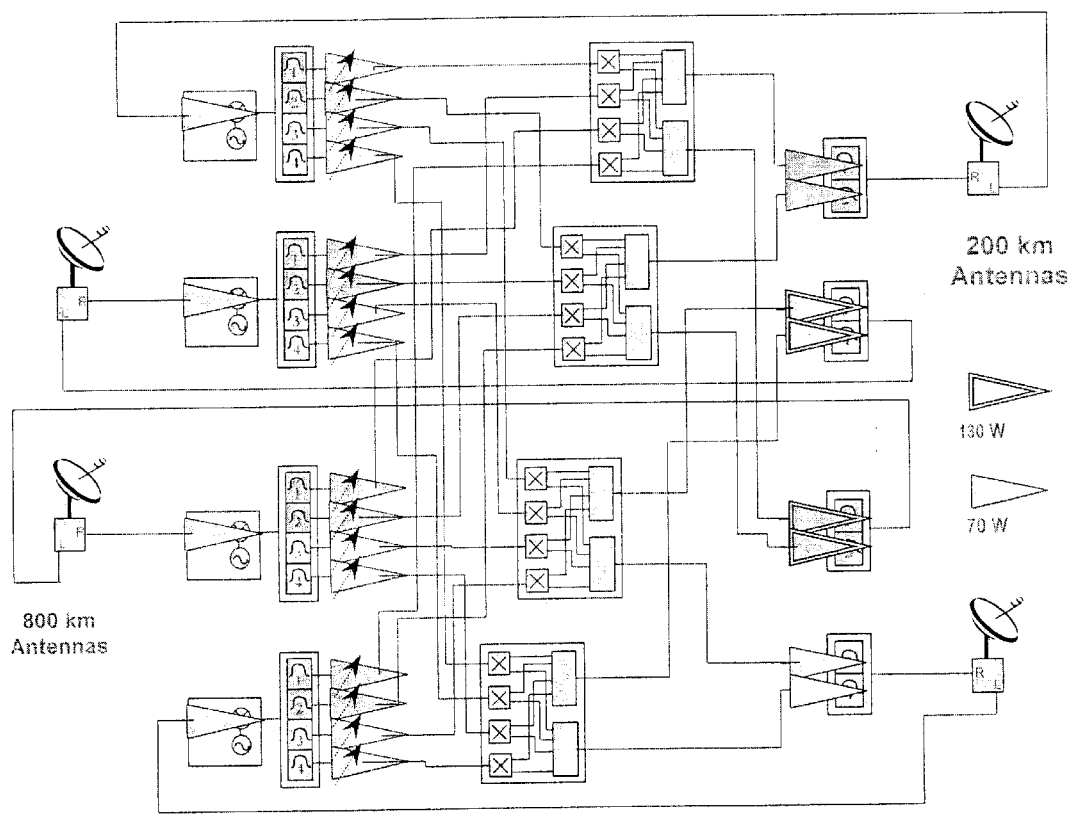
FIG. 9 is a conceptual block diagram of major components of a satellite that may be used in the invention.

FIG. 9 depicts a conceptual satellite component block diagram. In this example, each satellite has four independently steerable antennas, each of which can point to and track any location in the satellite's footprint. Each antenna supports simultaneous transmit and receive functions on orthogonal polarizations. Two antennas may serve areas up to 800 km diameter on the Earth's surface. Each of these antennas can receive up to four 115 MHz RHCP channels and can transmit up to two fixed-frequency 115 MHz LHCP carriers. Channels 1 and 2 are fixed-assigned to one antenna and channels 3 and 4 to the other. The remaining two antennas may serve areas up to 200 km diameter. Each of these antennas can receive up to four 115 MHz LHCP channels and can transmit up to two fixed-frequency 115 MHz RHCP. Channels 1 and 2 are fixed-assigned to one antenna and channels 3 and 4 to the other.

The satellite provides interconnectivity between an uplink channel received on any antenna and the corresponding downlink carrier on either of the two antennas that can transmit that carrier. Each received uplink channel is down-converted by a fixed frequency offset of 9.8 GHz to a corresponding downlink channel. The down-converted signal is routed via RF switches and bandpass filters to one of the two satellite-service cell antenna chains equipped for the downlink channel. Each channel is amplified by a TWTA, and the two channels are combined and transmitted via the antenna. This interconnectivity supports a number of operating modes as described below.

Transponders in the satellites can be operated in either a fixed-gain mode or an automatic level control (ALC) mode. The gateway-to-user terminal links (forward link) and bulk-data-delivery links normally operate single channel per carrier (SCPC), using ALC to maintain the downlink power amplifier at saturation. The user terminal-to-gateway links (reverse link) typically carry multiple user terminal subchannels and are normally operated in the fixed-gain mode, with the downlink operating at an appropriate back-off from saturation.

The satellite control system (SCS) generates the time-tagged commands that control satellite operation. The SCS may be connected to TTC systems that transmit these commands to, and receive telemetry from, the satellites. Processors on-board the satellites execute these commands to reconfigure transponders, steer antennas to new locations, track Earth-fixed locations within the satellite footprint, etc.

Various operating modes may be supported by a satellite data communication system as described above. The following are five exemplary modes of operation, though other modes of operation are easily contemplated:

Mode 1: Two satellite antenna beams serve two service cells of 800 km diameter, while two satellite antenna beams of 200 km diameter serve the associated gateways. The gateways may or may not be co-located with the service cells.

Mode 2: One satellite antenna beam of 200 km diameter serves a service cell, while another 200 km beam serves the associated gateway. No 800 km beams are used and the satellite operates at half capacity.

Mode 3: Two satellite antenna beams of 200 km diameter serve two service cells and their co-located gateways. No 800 km beams are used and the satellite operates at half capacity.

Mode 4: Two satellite antenna beams of 800 km diameter serve two service cells, while a 200 km beam serves a single gateway associated with both service cells. The gateway may or may not be co-located with the service cells.

Mode 5: Two service cells, one of which is served with an 800 km beam and the other with a 200 km beam. A single gateway serves both service cells. The gateway may or may not be co-located with one of the service cells and is served by a 200 km diameter beam from the satellite.

For the above operational modes, uplinks may operate in the 28.6–29.1 GHz band. In the 800 km beams, the uplinks use RHCP and in the 200 km beams, they use LHCP. Downlinks may operate in the 18.8–19.3 GHz band. In the 800 km beams, the downlinks use LHCP and in the 200 km beams, they use RHCP.

The uplink and downlink bands are divided into four transponder channels (designated Channels 1, 2, 3 and 4), each with a center-frequency separation of 125 MHz and a usable bandwidth of 115 MHz. An uplink channel can be connected only to its corresponding downlink channel, which is separated by 9.8 GHz. In addition, a small amount of spectrum is allocated for TTC communication channels in both the uplink and downlink beams.

Figure 10:
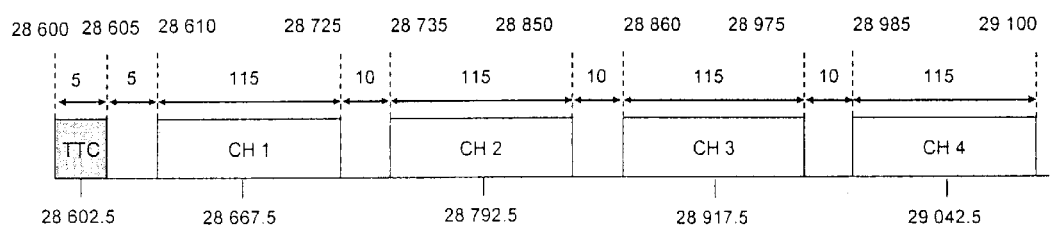
FIG. 10 depicts an exemplary uplink frequency and channelization plan.
Figure 11:
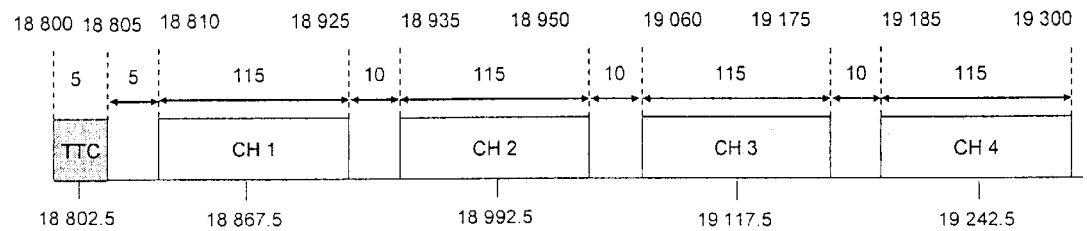
FIG. 11 depicts an exemplary downlink frequency and channelization plan.

FIGS. 9 and 10 illustrate an uplink and downlink frequency and channelization plan as described in the above example.

To provide interactive broadband data service, a suitable satellite data communication system of the present invention may use QPSK modulation with a predetermined concatenated code rate, though other modulation and coding techniques may be used. In one exemplary embodiment of the invention, a concatenated code rate of 0.533 may be used. Data packets may consist of a fixed number of bits, e.g., 1280 bits. For the forward data transmission link, the outer code may be an 8-bit-per-symbol-Reed-Solomon (200, 160) code, and the inner code may be a 64-state convolutional code of rate 2/3. Further, the interleaving depth may be 6, with 6 packets on the forward link. For the reverse data communication link, the outer code may be a 5-bit-per-symbol-Reed-Solomon (20, 16), and the inner code may be a 64-state convolutional code of rate 2/3. The interleaving depth may be 16 within a single packet. For this embodiment, the end-to-end bit error rate for the reverse and forward links may be $10^{-10}$. Of course, other embodiments of the invention may suitably use data coding and modulation having other parameters. Suitable data coding techniques are also described in patents assigned to the assignee of the present invention, e.g., U.S. Pat. No. 6,157,642 and U.S. Pat. No. 6,202,189, the disclosures of which are incorporated by reference herein.

As to bulk data delivery service, a suitable satellite data communication system of the invention may use 64-QAM modulation with a concatenated code rate of 0.533, though other modulation and coding may be used. In one embodiment of the invention, the outer code is an 8-bit-per-symbol-Reed-Solomon (200, 160) code, and the inner code is a 64-state convolutional code of rate 2/3. The end-to-end bit error rate for the link is $10^{-10}$. An interleaving depth of 6 is used with 6 packets.

In an example described earlier, a gateway can transmit up to four 115 MHz forward link channels simultaneously. The forward link channels can be directed to a single service cell (using two satellite antennas pointing to the same cell), or distributed among two or more cells. The satellite system preferably operates as a transparent repeater that can support a wide range of waveforms. In one exemplary embodiment, the forward link operates in a single-channel-per-carrier, time-division multiple access mode (SCPC-TDMA) using a single channel per transponder. For SCPC operation, the satellite transponder is normally operated in ALC mode: the downlink operates at saturation as long as the uplink flux density is within a specified operating range. For bulk-data-delivery service, there is typically a single terminal at both ends of the connection, and links in both directions are assumed to operate SCPC in a manner similar to the forward links.

Each forward link channel transports a single digital data stream from the gateway to a service cell. The stream is organized by time into variable length frames that transport data in packet format. Each packet (such as a network-layer IP packet or a MAC-layer control packet) is segmented (if necessary), encapsulated, and placed into the appropriate frame. Each frame can transport one or more encapsulated packet segments. The segment header includes the destination user terminal address, sequence and error control data, etc. Packets can be addressed to a specific user terminal, to a specified group of user terminals or to all user terminals within a service cell. The user terminals demodulate and decode the packet headers in the forward link(s) to which they are assigned, extract the packet segments addressed to them, and reassemble the segments into complete packets. Further description of data encapsulation and methods suitable for use in the present invention is provided in U.S. patent application Ser. No. 09/151,994 titled METHOD OF DATA TRANSMISSION IN A DATA COMMUNICATION NETWORK, which is assigned to the assignee of the present invention and incorporated by reference herein.

The reverse link is the communication path from the user terminals in a service cell via the serving satellite to an associated gateway. In an example described earlier, up to four 115 MHz transponder channels can be used as reverse links from a service cell to one or more associated gateways. In contrast to the forward link which has a single data source, the reverse link must support multiple user terminals transmitting simultaneously. In one exemplary embodiment, the reverse link uses multi-frequency, time-division-multiple-access (MF-TDMA) mode, although other multiple access modes such as CDMA may be supported.

For MF-TDMA operation, the reverse link channel may be subdivided in both the frequency and time domain into resource allocation units. The gateway uses a medium access control (MAC) layer protocol to allocate these channel resources (bandwidth and time slots) among user terminals on demand. The user terminals and gateway may use the MAC-layer protocol to negotiate the appropriate power level, modulation order, FEC coding rate, symbol rate, and time-slot assignments on the reverse link. The gateway allocates resources among user terminals based on the capacity requested by each user terminal, the available link capacity, and the waveforms that can be supported by the user terminal under the current link conditions. One objective of the MAC-layer control is to make efficient use of channel resources while maintaining a high level of service quality, including low-latency response to changes in user terminal demand. It may also be important for certain applications to maintain link availability as high as possible. This can be accomplished by changing to more robust waveforms at low bit rates when link conditions degrade.

Satellite data communication systems constructed according to the invention are preferably designed to provide high availability, e.g., 99.95%, for establishing and maintaining data communication links. At least one on-orbit spare is preferably available per satellite plane at all times. If any satellite fails, a spare satellite is preferably moved into the failed satellite position as soon as possible, e.g., in less than 72 hours. While in a failed-satellite condition, user terminals may experience limited outages, such as a 1-hour outage, twice daily. Compared with failed-satellite conditions in GEO satellite data communication systems, the overall system downtime is significantly less.

Link availability may also vary depending on environmental conditions, such as the density of cloud cover and amount of rain over a service cell. Link availability may also vary depending on the class of user terminal in the service cell. In order to maintain optimal system availability, the user terminals may operate at different data rates. For example, in clear sky conditions, the system may operate at its maximum rated bandwidth and data rates. In heavy rain, the system may reduce data rates to match the current conditions. A data communication link that is initially operated at its maximum rated data rate may reduce the rate in accordance with increasing path losses. Further description of suitable systems for varying the data rate with changing environmental conditions is provided in U.S. patent application Ser. No. 09/287,999, titled VARIABLE DATA RATE UPLINK IN A SATELLITE DATA COMMUNICATION NETWORK, assigned to the assignee of the present invention and incorporated by reference herein.

It is evident from the foregoing that embodiments of the invention may provide asymmetric data rates. For forward data transmission (i.e., downlink to user terminals), the user terminals may accept downlink burst data up to, e.g., 200 Mbps. With respect to reverse data transmission (i.e., uplink from user terminals), the data rates may vary from 128 Kbps to greater than 8 Mbps, depending on the class of user terminal involved. A typical Class I user terminal providing interactive data access may communicate data bursts at 512 Kbps per second. In heavy rain, the data rate may drop to 256 Kbps per second.

In terms of the medium access control (MAC) sublayer, the MAC sublayer is preferably optimized to handle data communication with the following characteristics: (1) always on; (2) bandwidth on demand; (3) real-time applications; (4) virtual private networks. An always on connection permits a user to quickly establish an Internet connection, preferably within a few seconds. Bandwidth on demand permits the system to quickly and efficiently manage resources to maximize the number of users that the system can support and make the system affordable. See, for example, U.S. Pat. No. 6,366,761, incorporated by reference herein. Low latency and a direct connection to an Internet backbone enable the system to support real-time applications such as voice over IP (VoIP), video conferencing, and net-meetings. As for VPNs, the system preferably supports both telecommuting and linking of remote offices with secure networks.

Another design advantage of a satellite data communication system of the present invention is its ability to communicate with multiple user terminals within a service cell at the same time. This broadcasting, or cell casting, capability may provide user terminals with real-time streaming data, as well as cached data, that can be stored at the user terminal and accessed by users at a later time.

With real-time streaming, users are able to receive data at a sufficiently high rate to enjoy high quality real-time content, without the jerky stop/go experience of today's consumer broadband delivery products. Preferably, the system also supports the delivery of entertainment on demand, such as movies and music that are stored and available on demand. With cell casting capabilities, all user terminals within a service cell may receive a copy of the movie or music at the same time, resulting in highly efficient content distribution.

Cached Internet content permits multiple users to quickly access and view the same Internet sites. These sites are cached at the user terminal 26, allowing quick access and eliminating the need to send content repeatedly over the space segment 22 (FIG. 2). Cached content also includes product updates, such as software product updates.

A satellite data communication system of the present invention has further advantages and capabilities that wire line terrestrial data communication systems cannot deliver. For example, a suitable system may be designed to support a high degree of user terminal mobility. A user terminal may travel anywhere, for example, within a service cell of 125,000 square kilometers and redirect its antenna toward the satellite to receive data that is broadcast by the satellite to the service cell. A system of the present invention also provides true multicasting to all user terminals within a large service cell.

A system of the present invention also has advantages over terrestrial wireless systems. These advantages include higher elevation angles, self-pointing user terminals, mobility throughout a service cell, and the ability to broadcast data to all user terminals within a large service cell.

While user terminal mobility is provided, the most common type of user terminal location is expected to be fixed. A fixed user terminal is typically attached to a rooftop or other permanent structure that provides for a stable, clear view to the satellites in the space segment. In terms of mobility, as long as a user terminal is located within a service cell, the user terminal is capable of communicating with the satellite data communication system. As a result, it is possible to mount a user terminal antenna to a vehicle or temporary structure and communicate from that location. For example, a user terminal can be mounted on a service van or construction trailer to provide communication to contractors at remote job sites. Additionally, emergency vehicles can be outfitted with transportable user terminals to provide broadband communications between accident sites and hospitals.

Nevertheless, it is recognized that physical Ka-band limitations may constrain system connectivity in some circumstances. Ka-band systems generally require line of sight transmission between the transmitter and receiver. Obstructions such as highway underpasses and "urban canyons" in cities may limit line of sight transmission for user terminals, while extreme attitude changes may challenge the antenna's ability to maintain consistent communications with the satellite overhead. For this reason, the user terminal antennas are preferably mounted to have a clear view above a specified elevation, such as 40 degrees. A clear view above 35 degrees elevation, for example, may be required for some user terminal latitudes.

The user terminals point their antenna beams toward the satellite and track the satellite continuously, either mechanically and/or electronically. Typically, user terminal and satellite tracking is performed using transmitted beacon signals. Time-tagged data may also be used to project the trajectory of a moving satellite and/or moving user terminal for proper pointing of the antennas.

As noted above, a satellite data communication system of the invention may provide bulk data transport services on a scheduled basis. Table 5 below describes service availability and daily throughput of four exemplary locations.

TABLE 5

Data Transport Service Availability and Daily Throughput

| User Terminal Location | Longest Service (minutes) | Longest Service Unavailability (minutes) | Total Service Availability (%) | Total Daily Throughput (Terabytes) |
|---|---|---|---|---|
| North Sea | 60 | 90 | 50 | 1.6 TB |
| Gulf of Mexico | 120 | 30 | 75 | 2.4 TB |
| Prudhoe Bay | 45 | 180 | 25 | 0.8 TB |
| Indian Ocean | 150 | 40 | 80 | 2.6 TB |

Vertical markets where bulk data transport services are highly valued include resource exploration, data backup, military operations, and entertainment. For resource exploration, moving core data or production data from off-shore platforms or survey ships to corporate data processing facilities can be very important. In terms of data backup, it can be valuable to move large databases or other content from remote locations to central facilities for backup. Data may also be moved from central facilities to remote locations for safe backup. An example of data transport service for military operations includes moving large image files in or out of a combat zone. The entertainment industry may use data transport services to move dailies from location shots to editing facilities and back again.

While several embodiments of the invention have been illustrated and described, it will be appreciated that various changes can be made therein without departing from the spirit and scope of the invention. The scope of the invention, therefore, should be determined from the following claims and equivalents thereto.

The embodiments of the invention in which an exclusive property or privilege is claimed are defined as follows:

1. A scalable satellite data communication system for providing incremental global data communication services, comprising:

(a) at least one satellite in non-geosynchronous orbit (NGSO) above the Earth;

(b) at least one user terminal located in a first Earth-fixed cell and having
   (i) an antenna capable of tracking the NGSO satellite above a user elevation mask;
   (ii) a receiver capable of receiving a forward downlink signal from the NGSO satellite; and
   (iii) a transmitter capable of transmitting a reverse uplink signal to the NGSO satellite; and (c) at least one gateway located in a second Earth-fixed cell and having
   (i) an antenna capable of tracking the NGSO satellite above a gateway elevation mask;
   (ii) a transmitter capable of transmitting a forward uplink signal to the NGSO satellite;
   (iii) a receiver capable of receiving a reverse downlink signal from the NGSO satellite; and
   (iv) a connection to a terrestrial data communication network, wherein the gateway receives data from the terrestrial data communication network for forward uplink transmission to the NGSO satellite, and transmits data received from the NGSO satellite via reverse downlink transmission to the terrestrial data communication network;

wherein the NGSO satellite includes
   (i) a steerable forward link receive antenna capable of receiving the forward uplink signal from the gateway in the second Earth-fixed cell;
   (ii) a steerable forward link transmit antenna capable of transmitting the forward downlink signal to the user terminal in the first Earth-fixed cell;
   (iii) a steerable reverse link receive antenna capable of receiving the reverse uplink signal from the user terminal in the first Earth-fixed cell; and
   (iv) a steerable reverse link transmit antenna capable of transmitting the reverse downlink signal to the gateway in the second Earth-fixed cell; and wherein the satellite data communication system provides a communication link between the user terminal and the terrestrial data communication network via the NGSO satellite and the gateway; and wherein the satellite data communication system is configured for incremental expansion in multiple stages by adding additional NGSO satellites that can be of different design or in different orbital configuration, the additional satellites providing data communication capabilities for additional user terminals and gateways located in additional Earth-fixed cells, the additional satellites being further configured to be backward compatible to communicate with existing user terminals and gateways in the satellite data communication system.

* * * * *